United States Patent Office 3,589,972
Patented June 29, 1971

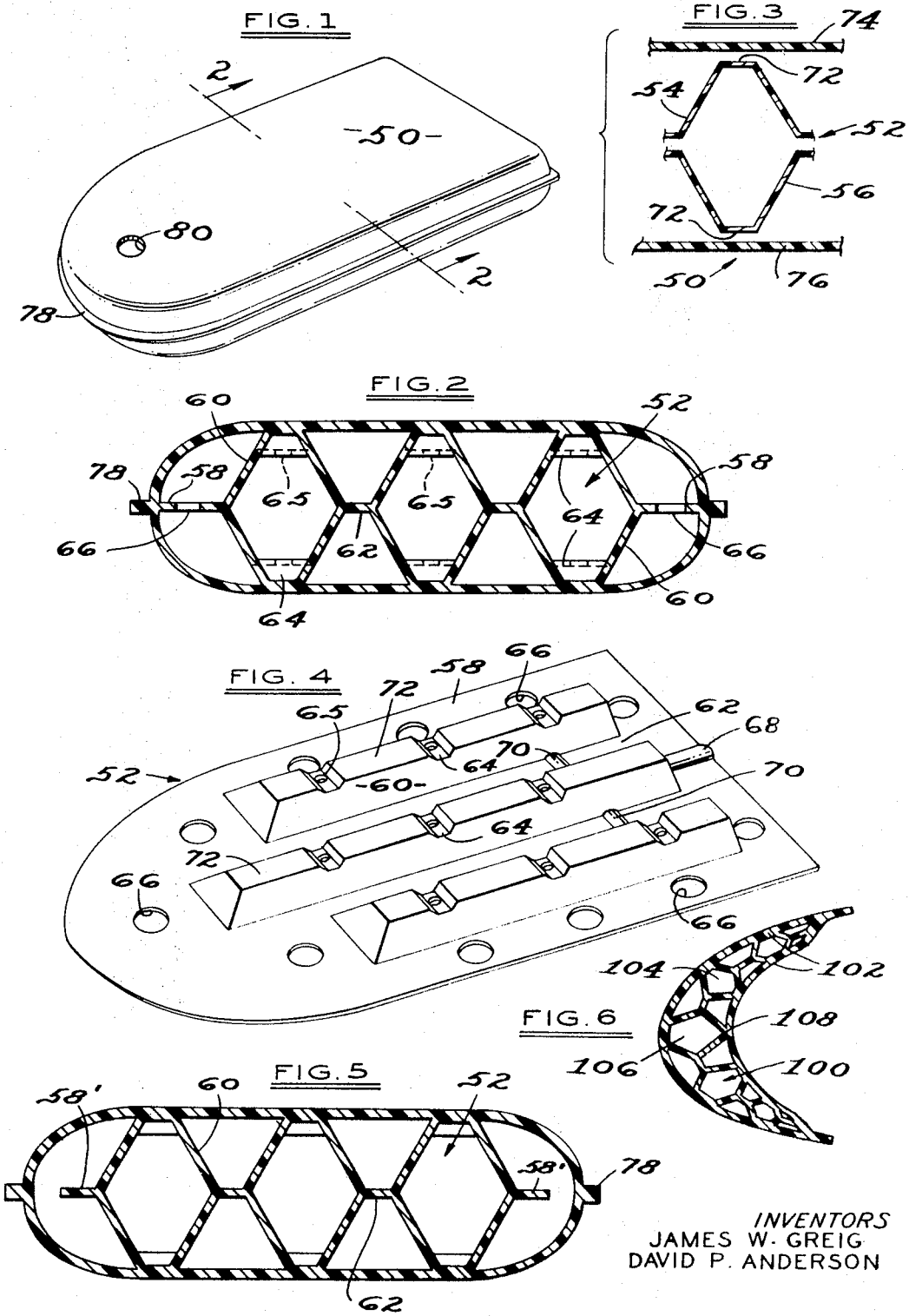

3,589,972
HOLLOW STRUCTURE
James W. Greig, Grosse Pointe Park, and David P. Anderson, Lathrup Village, Mich., assignors to Woodall Industries Inc., Detroit, Mich.
Continuation-in-part of application Ser. No. 512,639, Dec. 9, 1965, now Patent No. 3,462,330. This application June 16, 1969, Ser. No. 833,544
Int. Cl. B32b 3/12
U.S. Cl. 161—68            4 Claims

ABSTRACT OF THE DISCLOSURE

A hollow structure having an integral hollow plastic skin enclosing a core member. The plastic skin has an integral peripheral flange free of mechanical stresses, and the core member has a peripheral edge received within the flange of the skin. The core member in one embodiment is plastic, forming an integral flange, and portions of the core are displaced and fused to the skin between the flanges.

RELATED APPLICATIONS

This application for patent is a continuation-in-part application of our co-pending U.S. patent application Ser. No. 512,639, Dec. 9, 1965, now U.S. Pat. No. 3,462,330.

SUMMARY OF THE PRIOR ART

The prior art includes numerous examples of plastic structures, including structures having plastic and nonplastic core members. Cellular plastic cores are presently utilized in a wide variety of structures, including cushioning material, insulation, wall and ceiling structures, and various other applications. The individual components of the structural laminae are normally preformed from various plastic materials, and thereafter "heat sealed," plastic welded or adhesively bonded together. The method of securement generally depends upon the material to be secured and the particular application. Alternatively, the entire structure may be formed by injection molding, or the like, however the complexity of the structure is greatly limited by injection molding techniques.

The utilization of plastic laminated and hollow structures has been, however, limited by the poor structural integrity of the joints between the structural elements, and the mechanical stresses in the plastic parts at the joints. The joint is normally formed either by locally heating the preformed plastic element, or by applying an adhesive or solvent at the area to be joined. The local heating creates stresses in the part, and normally results in only partial "melting." The joint is therefore not uniform, and the elements do not become integral. The utilization of solvents also results in partial securement and leaves voids in the area secured. Adhesives are limited to certain types of materials, and separate the parts to be joined. Plastic parts joined by solvents and adhesives therefore cannot be characterized as integral.

The following U.S. patents are cited as examples of plastic laminates and structures shown by the prior art: 2,543,879, 2,703,770, 2,996,417, 3,086,899, and 3,142,599.

SUMMARY OF THE INVENTION

The hollow structure of this invention includes an integral plastic skin enclosing and securing a core member. The plastic skin is preferably formed from two or more thermoplastic sheets "fused" together into an integral hollow plastic structure, wherein both the sheets are heated to their fusion temperature, formed, and brought together while at their fusion temperature to form an integral peripheral flange, enclosing the core member. Where a thermoplastic core member is utilized, the core member may also be heated to its fusion temperature and fused at a predetermined location to the skin, forming an integral hollow plastic structure. A more detailed description of the method of forming the hollow plastic structure of this invention is made in our above referenced co-pending application for patent.

The resultant structure is free of mechanical stresses because the entire thermoplastic sheet is heated to its fusion temperature, not just a portion thereof as taught by the prior art. Further, the entire area contacted is fused into an integral structure, without the formation of voids, or the use of a foreign adhesive between the sheets.

In one of the disclosed embodiments of this invention utilizing a heat fusible thermoplastic core, the peripheral edges of the core are disposed between the flange portions of the plastic skin, resulting in an integral, substantially homogeneous flange, including the thermoplastic sheets comprising the skin and the core member. The core member may also include portions displaced from the axis of the flanges, which are fused to the inner surface of the plastic skin, forming an integral and common wall of the core and the skin.

In another embodiment of the invention herein described an automotive crash panel is formed, such as are utilized in the forward portion of automotive interiors. In this embodiment, the structure is in the form of a hollow panel shaped to conform to the automotive frame. Such structure is sufficiently self-supporting to maintain its contour and impressed shape without additional reinforcement, while possessing sufficient flexibility or energy absorptive characteristics to recover its shape after deformation pressure or impact. The plastic structure of this invention is especially meritorious in this embodiment, because the panel may be designed to yield or collapse on a predetermined impact by varying the design and shape of the plastic core, and by controlling the plastic fusion between the core and the plastic skin.

The improved structural elements of this invention are capable of supporting many times their own weight; for example, they are sufficiently rugged to be used in floor panels and door panels, yet are inexpensive and light in weight. The disclosed structure is also shock absorbent, which makes it useful in such applications as instrument cases and containers. Further, the structure may be formed into fluid type channels or containers, which provide light weight rugged containers for use as gas tanks and/or fluid conduits. These containers or conduits may be formed with several channels, or provided with an integral insulation chamber without additional forming operations. A variety of other structures may also be based on the teachings disclosed herein, and each may be relatively inexpensive to manufacture and light in weight, yet rugged in construction.

BRIEF DESCRIPTION OF THE DRAWINGS

FIG. 1 is a perspective view of a hollow plastic structure of the invention, such as a gas tank;

FIG. 2 is a cross sectional view taken on line 2—2 of FIG. 1;

FIG. 3 is an exploded fragmentary view of the cross section shown in FIG. 2;

FIG. 4 is a perspective view of one embodiment of the core member;

FIG. 5 is a cross sectional view of another embodiment of the structure shown in FIG. 1; and FIG. 6 is a cross sectional view of an automotive crash panel embodiment of the invention.

DESCRIPTION OF THE PREFERRED EMBODIMENTS

In the fabrication of the embodiments of this invention as shown in FIGS. 1 to 6, the process set forth in our United States Patent 3,242,245, filed June 18, 1965, which is a continuation-in-part application of Ser. No. 69,521, filed Nov. 15, 1960, now abandoned may be used. However, because the structure disclosed herein may be formed of four thermoplastic sheets, including the core member, the process has been modified as set out in our above referenced copending application for United States patent.

The embodiments shown in FIGS. 1 to 5 may be utilized as a container, as for example, an automotive gasoline tank. It is understood however that the invention is not limited to containers. The structure comprises an outer skin 50 and a core member, referred to generally as 52. The core 52 may be formed from two sheets of thermoplastic fused along opposed boundary margins 58. The elements of the basic structure are best shown in an exploded view FIG. 3, wherein the formed upper sheet 54 is brought into fusion contact with the lower sheet 56 while the sheets are maintained at their fusion temperature. The plastic core thus formed is illustrated in FIG. 4, and may be formed concurrently with the plastic skin in a continuous operation, or in a separate operation, as described in our copending application relating to the method. It is understood that the design of the core member 52, and the skin 50, shown, are illustrative only, and that any core or skin configuration may be used, dependent upon the desired product, and the limitations of the process described.

The core 52, best illustrated in FIG. 4, has a peripheral flange portion 58' which is the fused junction between the upper and the lower sheets. Between these flanges are oppositely displaced portions defining channels 60. Between these channels are inwardly disposed areas 62 which define further areas of fusion between the sheets. Between the areas 62, are a series of communication vents 64 which provide fluid communication between the outwardly disposed channels 60, and communication vents 65 which provide communication through the channel walls. Communication is provided through the peripheral flange portion 58 by the spaced apertures 66. A pressure inlet 68 is also provided to the center channel, and communication is provided between the hollow interior of the channels by the passages 70, which allow air communication between the sheets (i.e., between the hollow interior of the channels) during the forming operation, which is more fully explained in our United States Patent 3,242,-245, referred to hereinabove.

The oppositely displaced portions 60 of the core define oppositely disposed fusion faces 72, which are fused to the inner surface of the skin, as described hereinbelow. The skin 50 is formed in the same manner as the core 52; that is, from a pair of heat fusible plastic sheets, 74 and 76, which are heat sealed at their peripheral margins 78. The plastic sheets of the skin overlie, and are heat fused to the oppositely disposed faces 72 of the core member, forming a substantially unitary plastic structure.

In FIG. 2 the fused peripheral margins 78 of the skin are fused directly to the fused peripheral portion 58 of the core member. In the modification of FIG. 5 the fused peripheral flange portion 58 of the core does not extend into fused engagement with the skin. The structure of FIG. 2 provides somewhat more rigidity in the completed container, however the structure of FIG. 1 has free communication between the channels. The perspective view of the container shown in FIG. 1 illustrates an inlet 80, whose location and configuration would depend upon the function of the container.

FIG. 6 illustrates self-supporting automotive crash panel embodiment of this invention. The panel is formed in the manner herein described, and consists of a core, referred to generally at 100, fused to an outer skin 102. It can be seen that the rigidity of this structure may be varied by employing various designs of plastic cores, and by controlling the fusion between the core and the plastic skin. The structure illustrated employs four hexagonal channels 104 and one pentagonal channel 106. The pentagonal section 106 has only a point contact with the inner surface of the skin at 108, and therefore will be less rigid than the hexagonal sections which provide face to face contact. The rigidity of the core may thus be varied at desired locations, or the rigidity may be varied by the use of other geometric channel configurations. The fusion between the core 100 and the skin 102 may also be varied by controlling the area of the core available for fusion, such as by the use of the communication vents 64, shown in the core of the container in FIG. 4.

Conventional padded automotive crash panels often collapse under the pressures normally encountered in use, or deteriorate with age. Thus, they may be useless at the critical moment of impact. Further, such panels do not provide sufficient resistance to impact to provide adequate protection for the passengers. In the automotive crash panel embodiment of my invention, the impact required to collapse the structure may be varied to provide the optimum protection for a passenger, and the impact and pressure normally encountered in use will not deform the structure. Thus, the panel will maintain its structural integrity for use when it is critically needed.

The method disclosed in our above referenced copending application for patent includes disposing a pair of spaced thermoplastic sheets forming the outer skin, which have been heated to their fusion temperature, between a pair of opposed die faces, forming the sheets to their desired configuration by bringing the die faces into contact with the sheets, and preferably drawing a vacuum through the die faces to conform the sheets to the die faces. The core member is then disposed between the formed plastic sheets and the dies are closed to fuse predetermined portions of the core and sheets forming the outer skin. In the preferred embodiment of the method, the core is formed of a fusible thermoplastic having a similar shrink rate as the thermoplastic sheets forming the outer skin, and the core is either heated to near its fusion temperature prior to receipt between the thermoplastic sheets forming the skin or the core is formed immediately prior to insertion and maintained near its fusion temperature. In either case, the sheets forming the skin are maintained at their fusion temperature and are brought into contact with the core, such that a "full fusion" takes place between the core and the skin, providing an integral structure which can not be obtained by bonding or solvent welding which provides only a partial securement. The resultant structure is therefore homogeneous at the points of contact between the core and the skin, providing a stronger integral structure. Where the flanges of the core member are disposed between the flanges of the sheets forming the outer skin, the resulting flange in the integral structure has a thickness greater than the combined thicknesses of the sheets forming the outer skin, or approximately equal to the combined thickness of the skin and core member. The flange is integral and homogeneous throughout, providing an essentially one piece structure.

It can be seen from the structure and method herein described that the final structure is substantially free from stresses, and the areas of fusion have the same structural integrity as the original sheets. Previous structures, which required localized heating or bonding, created areas of stress inherent in the structure, and the bond between the elements could not be adequately controlled, and was seldom complete. Further, subsequent bonding steps are considerably more expensive, and are difficult to carry out in a substantially continuous operation. It should be understood that the structures disclosed herein are illustrative only, and that many other structures can be conceived without departing from the purview of the appended claims. For example, the core may be a single plastic sheet having oppositely displaced surfaces for fusing to the opposite outer skin sheets.

What is claimed is:

1. A relatively rigid hollow plastic structure comprising a hollow resinous plastic skin enclosing a plastic core member, said hollow plastic skin having an integral peripheral flange portion disposed between its opposite sides and encircling said core member, said core member comprising a pair of formed sheets heat sealed together at their peripheral edges and heat sealed to the opposite sides of said skin at a plurality of locations between their said edge portions, said sheets being heat sealed together in a plurality of spaced areas disposed between said locations, said core having a plurality of apertures therein to permit the flow of fluid freely around said core.

2. The structure set forth in claim 1 wherein said peripheral edges of said core are integrally heat sealed to the peripheral flange of said skin and the combined edge and flange portion structure has a total thickness greater than the thickness of said skin.

3. A relatively rigid hollow plastic structure comprising a hollow resinous plastic skin enclosing a plastic core member, said hollow plastic skin having an integral peripheral flange portion disposed between its opposite sides and encircling said core member, said core member comprising a pair of formed sheets heat sealed together at their peripheral edges and heat sealed to the opposite sides of said skin at a plurality of locations between their said edge portions, said sheets being heat sealed together in a plurality of spaced areas disposed between said locations, said core having a plurality of communication vents therein to permit the flow of fluid freely around said core.

4. A relatively rigid hollow plastic structure comprising a hollow resinous plastic skin enclosing a plastic core member, said hollow plastic skin having an integral peripheral flange portion disposed between its opposite sides and encircling said core member, said core member comprising a pair of formed sheets heat sealed together at their peripheral edges and heat sealed to the opposite sides of said skin at a plurality of locations between their said edge portions, said sheets being heat sealed together in a plurality of spaced areas disposed between said locations, said core having a plurality of apertures and communication vents therein to permit the flow of fluid freely around said core.

References Cited
UNITED STATES PATENTS

| | | | |
|---|---|---|---|
| 2,042,586 | 6/1936 | Campbell et al. | 161—136X |
| 2,518,164 | 8/1950 | Meyer | 156—513 |
| 3,141,913 | 7/1964 | Edwards | 264—210 |
| 3,231,454 | 1/1966 | Williams | 161—110 |
| 3,242,245 | 3/1966 | Greig et al. | 156—285X |
| 3,461,632 | 8/1969 | Kuhne | 52—615 |
| 3,294,389 | 12/1966 | Chavannes | 161—127X |
| 3,388,522 | 6/1968 | Lowes | 161—127X |

JOHN T. GOOLKASIAN, Primary Examiner

H. F. EPSTEIN, Assistant Examiner

U.S. Cl. X.R.

52—309, 615; 161—109, 122, 127